(12) United States Patent
Roeske

(10) Patent No.: US 7,239,509 B1
(45) Date of Patent: Jul. 3, 2007

(54) MODULAR COMPUTER COMPONENTS

(76) Inventor: Matthew Roeske, 4252 N. Oriole, Norridge, IL (US) 99802

( * ) Notice: Subject to any disclaimer, the term of this patent is extended or adjusted under 35 U.S.C. 154(b) by 276 days.

(21) Appl. No.: 10/967,846

(22) Filed: Oct. 18, 2004

(51) Int. Cl.
*G06F 1/16* (2006.01)

(52) U.S. Cl. ...................................... 361/683; 361/679

(58) Field of Classification Search ............... 361/679, 361/683
See application file for complete search history.

(56) References Cited

U.S. PATENT DOCUMENTS

| | | | |
|---|---|---|---|
| 4,501,460 A | | 2/1985 | Sisler |
| 4,558,914 A | | 12/1985 | Prager et al. |
| 5,311,397 A | | 5/1994 | Harshberger et al. |
| 5,363,275 A | | 11/1994 | Frankeny et al. |
| 5,602,721 A | | 2/1997 | Slade et al. |
| 5,604,662 A | * | 2/1997 | Anderson et al. ........... 361/685 |
| 5,901,057 A | * | 5/1999 | Brand et al. ................. 363/144 |
| 6,118,663 A | | 9/2000 | Fan |
| 6,366,454 B1 | | 4/2002 | Rapaich et al. |
| 6,636,421 B2 | | 10/2003 | Clidaras et al. |
| 6,661,648 B2 | | 12/2003 | Dayley |
| 6,697,251 B1 | | 2/2004 | Aisenberg |
| 2006/0002070 A1 | * | 1/2006 | Jenkins et al. .............. 361/683 |
| 2006/0187627 A1 | * | 8/2006 | Kobayashi ................... 361/683 |

* cited by examiner

*Primary Examiner*—Yean-Hsi Chang
(74) *Attorney, Agent, or Firm*—Michael I Kroll

(57) ABSTRACT

Apparatus 10 for a computer system comprising a plurality of interconnecting modules 16, 18, 20 with each module in the series having computer components encased therein, and external linking and connector elements extending therefrom forming a functioning computer. Each module contains one or more hardware components such as processor 60, DVD 62, video card 54, memory 58, power supply 55, motherboard 46, etc. that provides the user with means for determining and assembling a computer system comprised of user selectable and swappable component modules that plug into each other. The modules are typically of a thin rectangular form and have a structure formed of either a metallic chassis 12 or a plurality of interconnecting panels with knock out portions 40 to allow for connection there through to the computer component's connection ports. The modules connect to one another via a plurality of spring mounted clips 74 on the top that snap into apertures in the bottom of the mating module so that this maintains the module's physical connection to one another having push buttons on the sides of each module for the selective release when so desired. Also, a plurality of jumper elements 84 are used to transmit data or power therethrough and between the modules to where it is needed.

19 Claims, 12 Drawing Sheets

MODULAR COMPUTER COMPONENTS

BACKGROUND OF THE INVENTION

1. Field of the Invention

The present invention relates generally to electronics and, more specifically, to a computer system comprising a plurality of interconnecting modules with each module in the series, having computer components encased therein, and external linking and connector elements extending therefrom forming a functioning computer.

Each module contains one or more hardware components such as processor, DVD, video card, memory, power supply, motherboard, etc. that provides the user with means for determining and assembling a computer system comprised of user selectable and swappable component modules that plug into each other.

The modules are typically of a thin rectangular form and have a structure formed of either a metallic chassis with assorted modules attached about its form to house the contained electronic components with said chassis modules serving as either venting, a connection means or structure. The modules may also instead be constructed of a plurality of interconnecting panels with knock out portions for there removal, to allow for connection there through to the computer component's connection ports. The modules connect to one another via a plurality of spring mounted clips on the top that snap into apertures in the bottom of the mating module, this maintains the module's physical connection to one another having push buttons on the sides of each module for the selective release when so desired, also a plurality of jumper elements are used to transmit data or power therethrough and between the modules to where it is needed. Ports for electrical interconnection between the modules preferably are mounted to the top and bottom panels and are outfitted with all required data and power transmission port types. The layout on the ports on the top and bottom panels are also preferably in a symmetrical orientation to correctly align and maintain uniformity between all the modules comprising the completed computer. Additionally, this system may be adapted to existing computers by providing a top module that is hardwired to the original computer case that serves as an adapter like component that allows for future add-ons of modules thereto for upgrading purposes.

2. Description of the Prior Art

There are other reflective modular computers designed for enabling customization and upgrades. Typical of these is U.S. Pat. No. 4,501,460 issued to Sisler on Feb. 26, 1985.

Another patent was issued to Harshberger on May 10, 1994 as U.S. Pat. No. 5,311,397. Yet another U.S. Pat. No. 5,363,275 was issued to Frankeny, et al. on Nov. 8, 1994 and still yet another was issued on Feb. 11, 1997 to Lester as U.S. Pat. No. 5,602,721.

Another patent was issued to Prager, et al. on Dec. 17, 1988 as U.S. Pat. No. 4,558,914. Yet another U.S. Pat. No. 6,118,663 was issued to Fan on Sep. 12, 2000 and still yet another was issued on Apr. 2, 2002 to Rapaich, et al. as U.S. Pat. No. 6,366,454.

Another patent was issued to Clidaras, et al. on Oct. 21, 2003 as U.S. Pat. No. 6,636,421. Yet another U.S. Pat. No. 6,661,648 was issued to Dayley on Dec. 9, 2003 and still yet another was issued on Feb. 24, 2004 to Aisenberg as U.S. Pat. No. 6,697,251.

Another patent was issued to Ellger on Oct. 25, 2002 as Patent No DE 10019327. Yet another Patent No. CA2,354, 181 was issued to Kontron Communications Inc. on Jul. 26, 2003.

U.S. Pat. No. 4,501,460

Inventor: John R. Sisler

Issued: Feb. 26, 1985

An improved housing and associated latching mechanism that render practicable the implementation of a completely modular computer system. The latching mechanism effects simple positive engagement and disengagement of the pin and socket connectors as respective outer surfaces of a first wall on a first module housing and a second wall on a second module housing are brought together or separated. The second wall carries a plurality of hooking members which pass through corresponding apertures in the first wall and are captured and restrained by a reciprocable latch bar inside the first housing. A rotary latch engages the latch bar such that actuation of a handle on the rotary latch causes reciprocation of the latch bar between a first accommodating position and a second capturing position. The hooking members have respective camming surfaces in spaced facing relationship to the external surface of the second wall while the latch bar is formed with complementarily configured camming surfaces spaced and located so as to engage the camming surfaces on the hooking members when the latch bar moves towards its capturing position. The hooking members are distributed over the surface so that the modules are drawn together in a direction that minimizes sideways forces on the pins in the connector.

U.S. Pat. No. 4,558,914

Inventor: Jay M. Prager

Issued: Dec. 17, 1985

By providing an input/output module which incorporates post means formed thereon and slider means connected thereto and movable into and out of locking engagement with the post means of an adjacent module, a unique input/output module is achieved that is rapidly mounted to an adjacent module as well as rapidly disconnected therefrom. Preferably, each input/output module incorporates mating connector means positioned on opposite surfaces thereof, whereby each input/output module electronically directly connects to an adjacent module for communication with a central processor.

U.S. Pat. No. 5,311,397

Inventor: Martin J. Harshberger

Issued: May 10, 1994

A computer assembly comprised of a plurality of modular units which are readily connectable by pluggable terminals to permit quick interchangeability and/or replacement of certain units by untrained and unskilled personnel. The computer assembly includes a docking bay module provided with a number of external connectors for connection to equipment such as a keyboard, printer, cash register, etc., and a power supply plug. A CPU module containing the logic circuitry is slidably mounted in and out of the docking bay module and is readily connected by mating pluggable terminals to the various equipment linked to the external connectors on the docking bay module. A peripheral bay module may be added to the docking bay and CPU modules to function as a file server station in a local area network environment. The CPU module is quickly and conveniently replaced by unskilled personnel for maintenance and repair purposes. The CPU module is constructed in such a way that cooling of the circuit components is accomplished without the presence of a cooling fan. Because the CPU module is quickly and easily replaced in the docking module by unskilled personnel, the customer need not maintain an inventory of spare parts but may rely on overnight delivery service from a maintenance contractor for a replacement CPU module.

U.S. Pat. No. 5,363,275

Inventor: Jerome A. Frankeny, et al

Issued: Nov. 8, 1994

Discrete computational elements are provided that will be connected to a base unit, and to one another or I/O devices, in order to configure a particular computer system. The base unit provides the electrical power required to energize the computational elements. A plurality of identically configured substrates are joined in a layered relation and are electrically connected with one another. These substrates are capable of being fabricated of different lengths such that they can extend outwardly from the computational element and may be connected to other computational elements. At least one integrated circuit will be placed on one side of the joined substrates and is electrically connected to each substrate layer. In this manner the ICs will be able to communicate with chips on other computational elements. A support member is also included that stiffens the plural substrate layers and independently distributes electrical power through voltage and ground potential planes, and interconnected substrate layers, to the chips. The support member will be disposed adjacent the substrate layers on a side opposite the ICs and independently attachable to the base unit by using electrical connection pins, a pluggable lip portion, or the like.

U.S. Pat. No. 5,602,721

Inventor: Boyd Slade, et al.

Issued: Feb. 11, 1997

An expandable system such as a computer system includes a plurality of stacked functional modules with each module engaging an abutting module in a physically locked relationship. Electric power for the modular system is provided to all modules through power lines within each module housing for EMI shielding with abutting modules having mating electric power connectors.

U.S. Pat. No. 6,118,663

Inventor: Yu-Han Fan

Issued: Sep. 12, 2000

A multi-configuration modular computer that can be configured to be different types of personal computers or associated computer devices is disclosed. The multi-configuration modular computer comprises a display module, a keyboard and pointer device module, a motherboard and power module, and an expansion module. By selecting and combining different modules, the multi-configuration modular computer can be configured to be a LCD display monitor, a pen-based computer, a terminal, a network personal computer, a sub-notebook computer, a notebook computer or a desktop computer.

U.S. Pat. No. 6,366,454

Inventor: Mark Rapaich

Issued: Apr. 2, 2002

A modular information handling system includes an upper chassis having a display and a power supply, and a lower chassis having a motherboard, memory, a processor, and a number of drive bays. The upper and lower chassis are interdependent, neither capable of functioning without the other. The upper and lower chassis are separately manufacturable, separately serviceable, and separately shippable.

U.S. Pat. No. 6,636,421

Inventor: Jimmy Clidaras

Issued: Oct. 21, 2003

A method for datum sharing between modular computer system components, includes determining a position and orientation of a motherboard, defining at least one datum feature in a primary chassis describing the position and orientation of the motherboard, and defining at least one datum feature in a secondary chassis corresponding to the at least one datum feature in the primary chassis. An apparatus for datum sharing includes at least one datum feature of the primary chassis, at least one datum feature of the motherboard, wherein a location of the at least one datum feature of the primary chassis is based upon the at least one datum feature of the motherboard, and at least one datum feature of the secondary chassis, wherein a location of the at least one datum feature of the secondary chassis is based upon the location of the at least one datum feature of the primary chassis.

U.S. Pat. No. 6,661,648

Inventor: J. John Dayley

Issued: Dec. 9, 2003

A modular processor based system has a plurality of interchangeable modular components with power and communications connection means on top and bottom walls whereby the components may be operably connected to one another through vertical stacking. Modular components preferably include a processor, printer, memory, network communications, and hard drive components. Preferred connectors are mating male and female connectors on module top and bottom walls. The modular system of the invention provides important space saving and ease of connection advantages through its modular, stacked configuration.

U.S. Pat. No. 6,697,251 B1

Inventor: Alain Aisenberg

Issued: Feb. 24, 2004

A modular computer user interface system particularly adaptable for use with portable computers and comprising the integration therewith of at least one, but in certain specific embodiments, a plurality of auxiliary modules, such as keypads, interfaced with the processor independent of the conventional keyboard. The one or more auxiliary modules may be permanently secured to the platform of the portable computer in spaced, segregated relation to the keyboard and keys associated therewith. Alternatively, one or more of the auxiliary modules may be removably mounted on or detachably connected to the platform and keyboard, wherein regardless of their fixed, removable or detached relation to the platform of the computer, each of the auxiliary modules are independently operable to effect data and signal communication with the central processor of the computer, independent of operation of the conventional keyboard. The plurality of auxiliary modules may each be independently structured to perform various functions and therefore are independently operative as a numerical keypad, a proprietary keypad for processing specialized software and/or another type of user interface module.

German Patent Number DE10019327

Inventor: Christian Ellger

Issued: Oct. 25, 2001

The complete assembly (d) comprises two or more individual matching, stacked blocks.

Canadian Patent Number CA2,354,181

Inventor: Kontron Communications Inc.

Issued: Jul. 26, 2003

A computer system wherein an assembly of passive backplane modules allow a variety of active boards of the same or of different architectures to be used in the same chassis. This technology differs from any others in that it presents a second level of modularity in addition to the usual one, which is putting active boards in a passive backplane. In addition, several backplane modules of different types allow different architectures to be used on a slot by slot basis and wiring requirements to link said backplane modules are minimized.

While these modular computers may be suitable for the purposes for which they were designed, they would not be as suitable for the purposes of the present invention, as hereinafter described.

SUMMARY OF THE PRESENT INVENTION

The present invention discloses a computer system comprising a plurality of interconnecting modules with each module in the series having computer components encased therein, and external linking and connector elements extending therefrom forming a functioning computer. Each module contains one or more hardware components such as processor, DVD, video card, memory, power supply, motherboard, etc. that provides the user with means for determining and assembling a computer system comprised of user selectable and swappable component modules that plug into each other. The modules are typically of a thin rectangular form and have a structure formed of either a metallic chassis or a plurality of interconnecting panels with knock out portions to allow for connection there through to the computer component's connection ports. The modules connect to one another via a plurality of spring mounted clips on the top that snap into apertures in the bottom of the mating module so that this maintains the module's physical connection to one another having push buttons on the sides of each module for the selective release when so desired. Also, a plurality of jumper elements are used to transmit data or power therethrough and between the modules to where it is needed.

A primary object of the present invention is to provide a modular computer having a plurality of modules having individual computer components such as the processor, mother board, video card, etc. contained therein, with each said module having sufficient ports and connections arranged symmetrically for quick and easy interconnection and sufficient data/power distribution.

Another object of the present invention is to provide a modular computer having easy to connect modules having spring loaded clips that engage mating apertures to form a fast and solid physical connection.

Yet another object of the present invention is to provide a provide a modular computer having module chassis that may either be frame or panel based, having either plug in smaller, port modules or knockouts affixed to the side panels to allow the user to customize there port and plug locations from which they extend therefrom the modules.

Still yet another object of the present invention is to provide a modular computer having an adaptable top module that may be hardwired to existing computers to allow the existing computer to be upgrade or modified in this same manner.

Yet another object of the present invention is to provide a provide a modular computer having modules that all have the same symmetrical outlay of Ports and connectors to allow the user to attach individual modules to on another in a quick and uniform manner.

Still yet another object of the present invention is to provide a provide a modular computer having a plurality of push buttons located on the modules sides to allow for the easy and selective disengagement of the computer modules from one another.

Additional objects of the present invention will appear as the description proceeds. The following detailed description is, therefore, not to be taken in a limiting sense, and the scope of the present invention is best defined by the appended claims.

The present invention overcomes the short comings of the prior art by providing a modular computer composed of a plurality of modules containing individual computer components such as the mother board, processor, video card, etc. having a changeable/rearrangable ports that have extending there from its top and bottom a plurality of electrical connector ports arranged symmetrically about the individual modules upper and lower panels to increase the modules ease of installation and interconnection to one another. Additionally, the present inventions individual modules connect to one another by a plurality of spring mounted clips that attach to a mating aperture and disengage via pushbuttons. In addition, the present invention may be modified to be hardwired to the top of an existing computer to provide modular upgrading or replacement options for the existing computer in the same manner.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
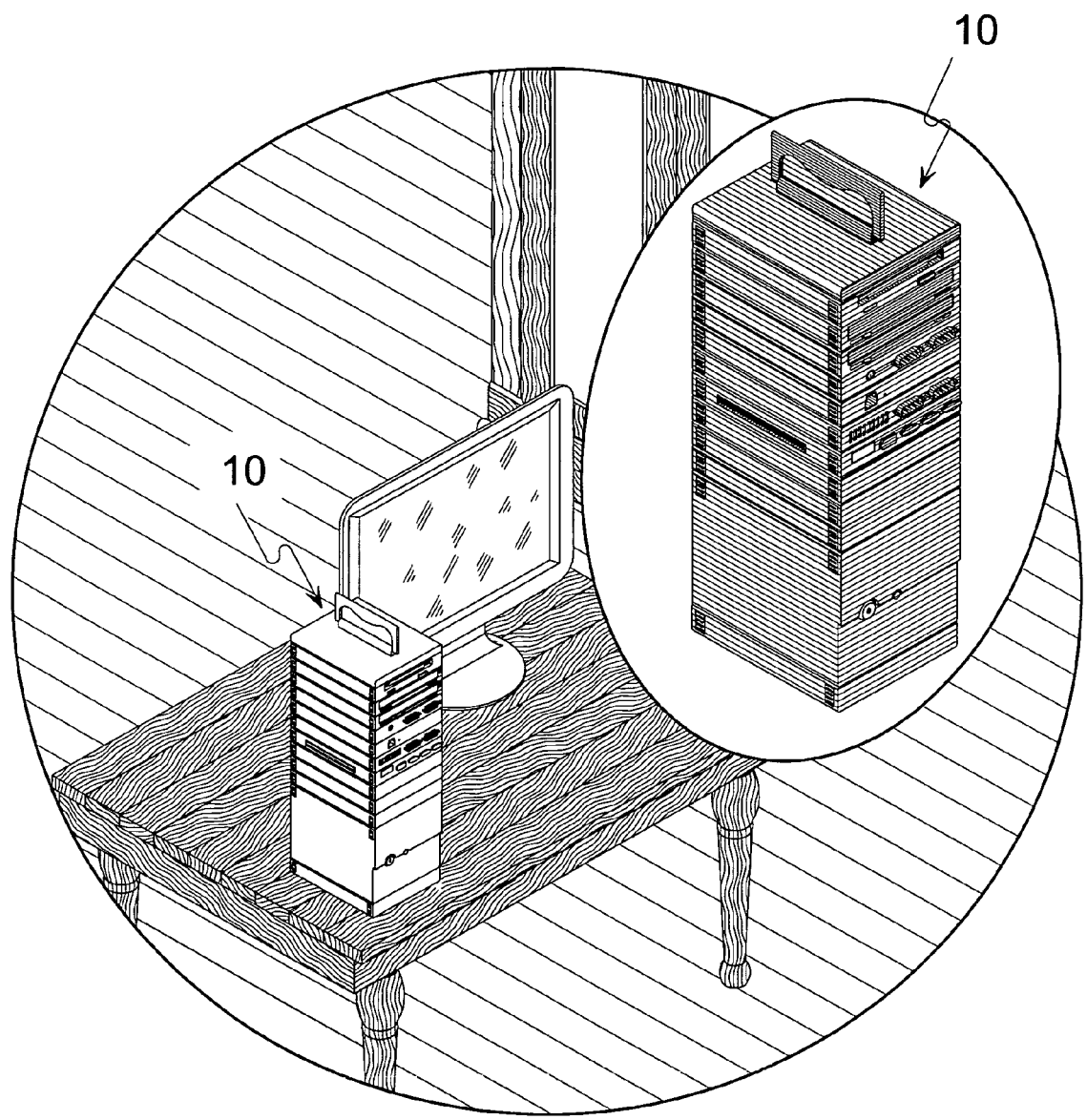
FIG. 1 is an illustrative view of the present invention.

With regard to reference numerals used, the following numbering is used throughout the
- 10 present invention
- 12 chassis
- 14 molding
- 16 blank module
- 18 venting module
- 20 port module
- 22 USB port
- 24 panel
- 26 top panel
- 28 bottom panel
- 30 front panel
- 32 back panel
- 34 side panel
- 36 screws
- 38 spacers
- 40 knockout
- 42 miscellaneous port
- 44 power supply module
- 46 motherboard module
- 48 scanner module
- 50 port module
- 52 network module
- 54 video module
- 56 cap module
- 58 memory module
- 60 processor module
- 62 DVD module
- 64 CD RW drive module
- 66 floppy disk drive module
- 68 AC power input
- 70 AC power output
- 72 power switch
- 74 clip
- 76 push button
- 78 aperture
- 80 module power connector
- 82 circuit signal connector
- 84 jumpers
- 86 base module

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10. The present invention 10 discloses an electronic packaging system for a modular computer system and provides a design for building or upgrading a desktop or mini-tower type computer. The end user easily assembles the individual modules for the power supply, motherboard, processor and disk drives. Other modules such as a scanner, DVD player or a network card can be added as desired. All of the modules can be upgraded by simply removing the existing module from the stack and replacing it with the new one. Unlike prior art, the motherboard and or processor can be changed with no concerns of space restrictions of the existing desktop case.

Figure 2:
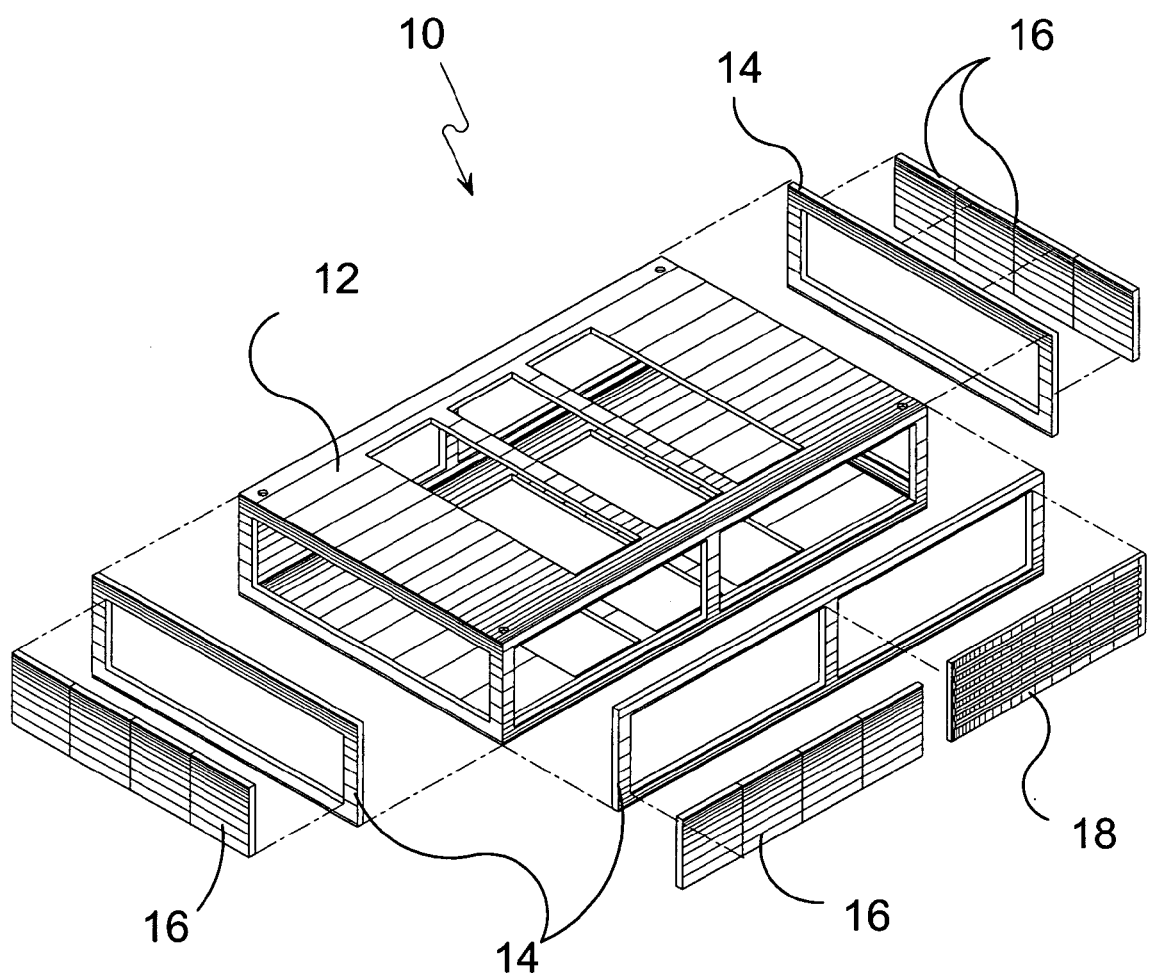
FIG. 2 is an exploded view of the present invention.

Turning to FIG. 2, shown therein is an exploded view of the present invention 10. Shown is the metal chassis 12 that forms a support frame for the individual modules of the present invention, depicting how each of the modules have a construction that is also modular and customizable, utilizing a plurality of different interchangeable top and side pieces that offer such expandable options such as additional venting, connections and encasement. Shown are molding 14, and blank 16, venting 18 and port 20 modules.

Figure 3:
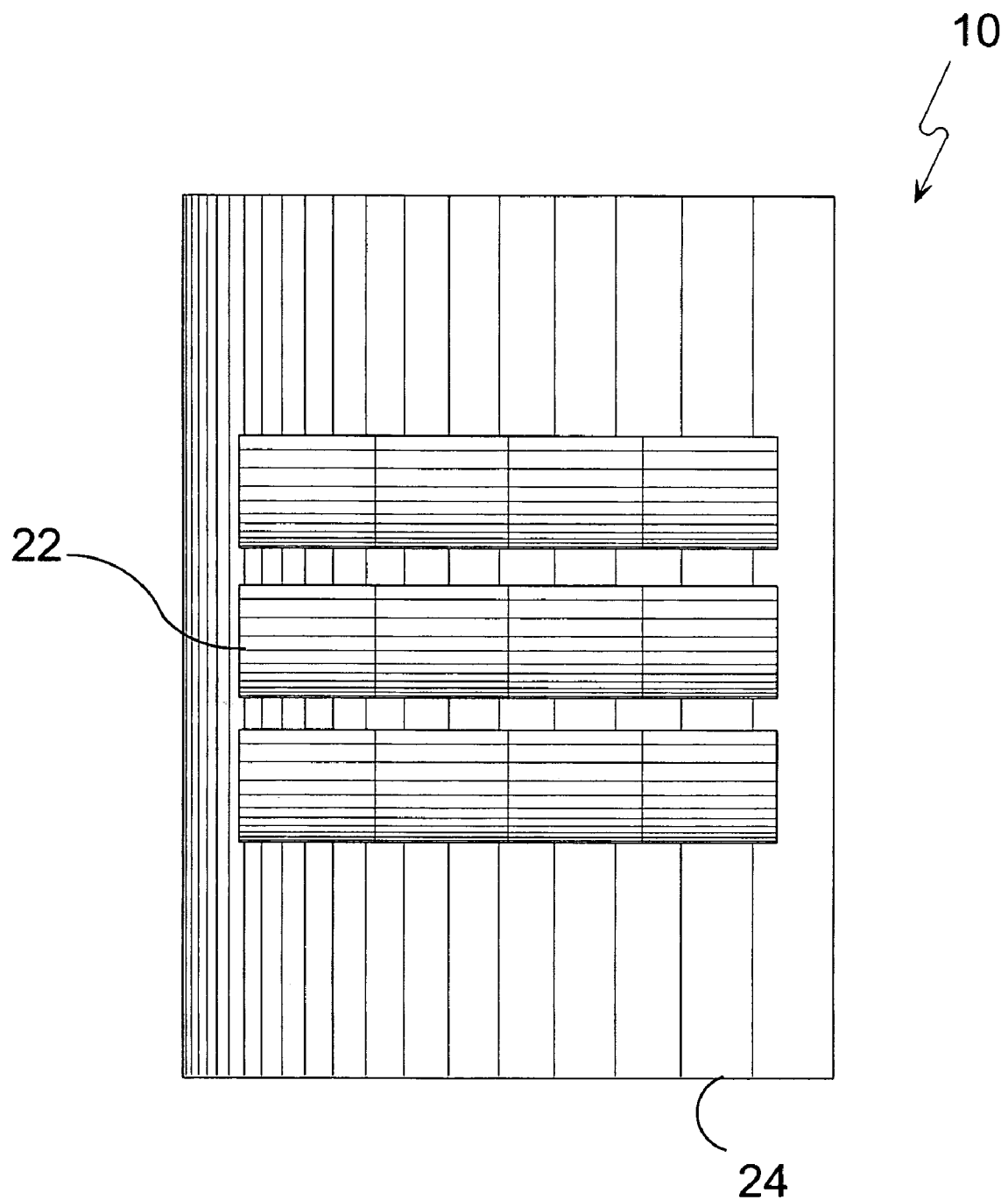
FIG. 3 is a top view of the present invention.

Turning to FIG. 3, shown therein is a top view of the present invention 10. Shown is one possible arrangement of the present invention's connecting ports, with the USB ports 22 being in symmetrical relation to one another to allow for a mating module to be easily connected thereto and also allowing component to be installed facing either direction. The panel 24 of the module is shown.

Figure 4:
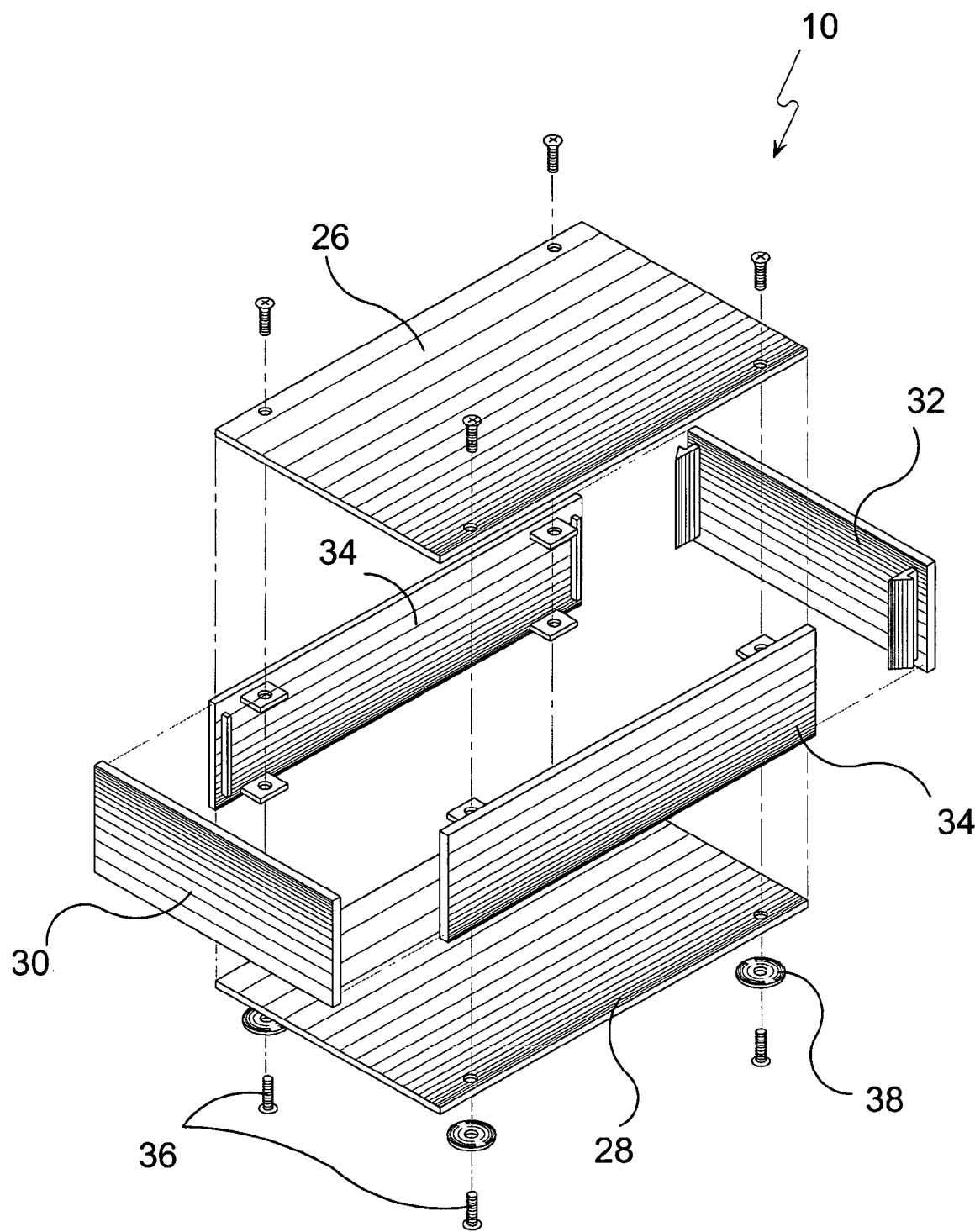
FIG. 4 is an illustrative view of the present invention.

Turning to FIG. 4, shown therein is an illustrative view of the present invention 10. Shown is the module of the present invention having a chassis that is composed of a plurality of panels that may be featured with knock out pieces or inserts for the addition or subtraction of venting or ports. Shown are top 26, bottom 28, front 30, back 32 and side 34 panels, with screws 36 and spacers 38.

Figure 5:
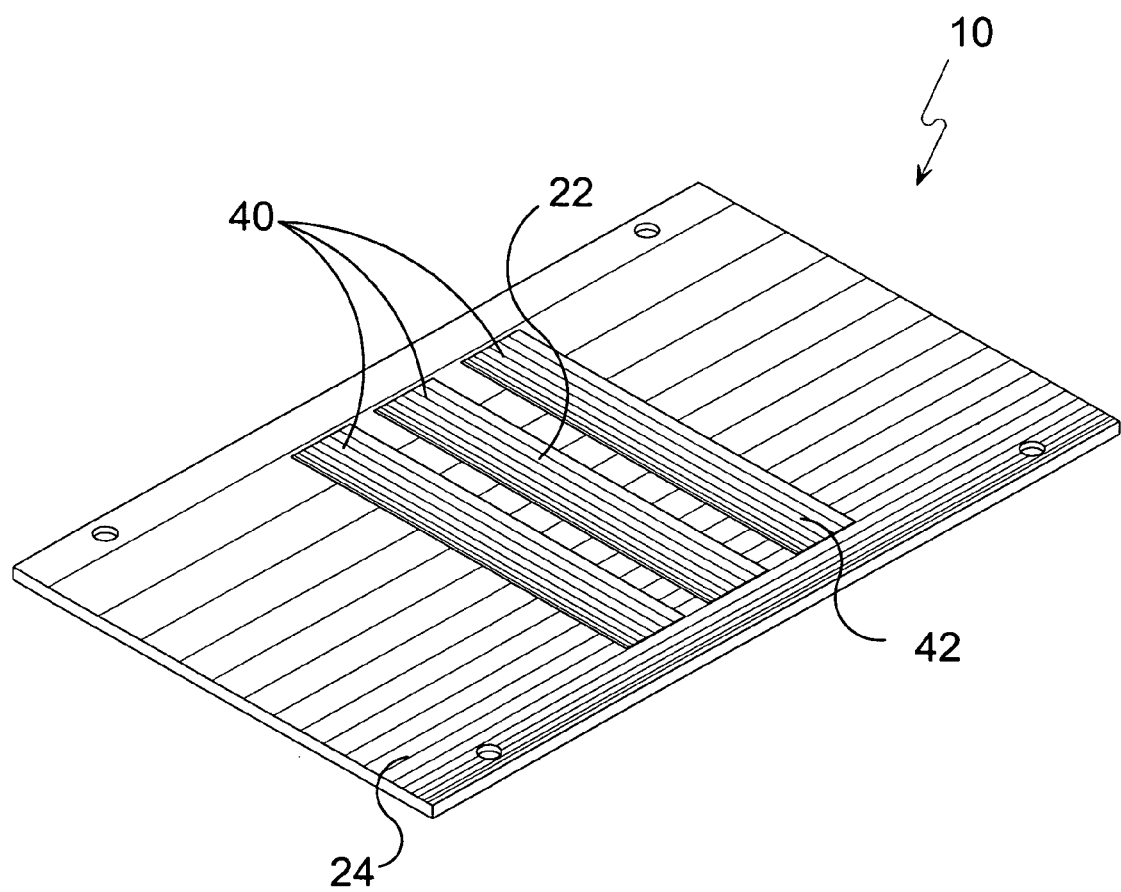
FIG. 5 is an illustrative view of the present invention.

Turning to FIG. 5, shown therein is an illustrative view of the present invention 10. Shown is the panel 24 of the present invention 10 having multiple cutouts with knockout areas 40 whereby additional ports may be added by removing the knockouts, or ports may be removed and then filled in by the knockout pieces. Shown are USB port 22 and miscellaneous port 42.

Figure 6:
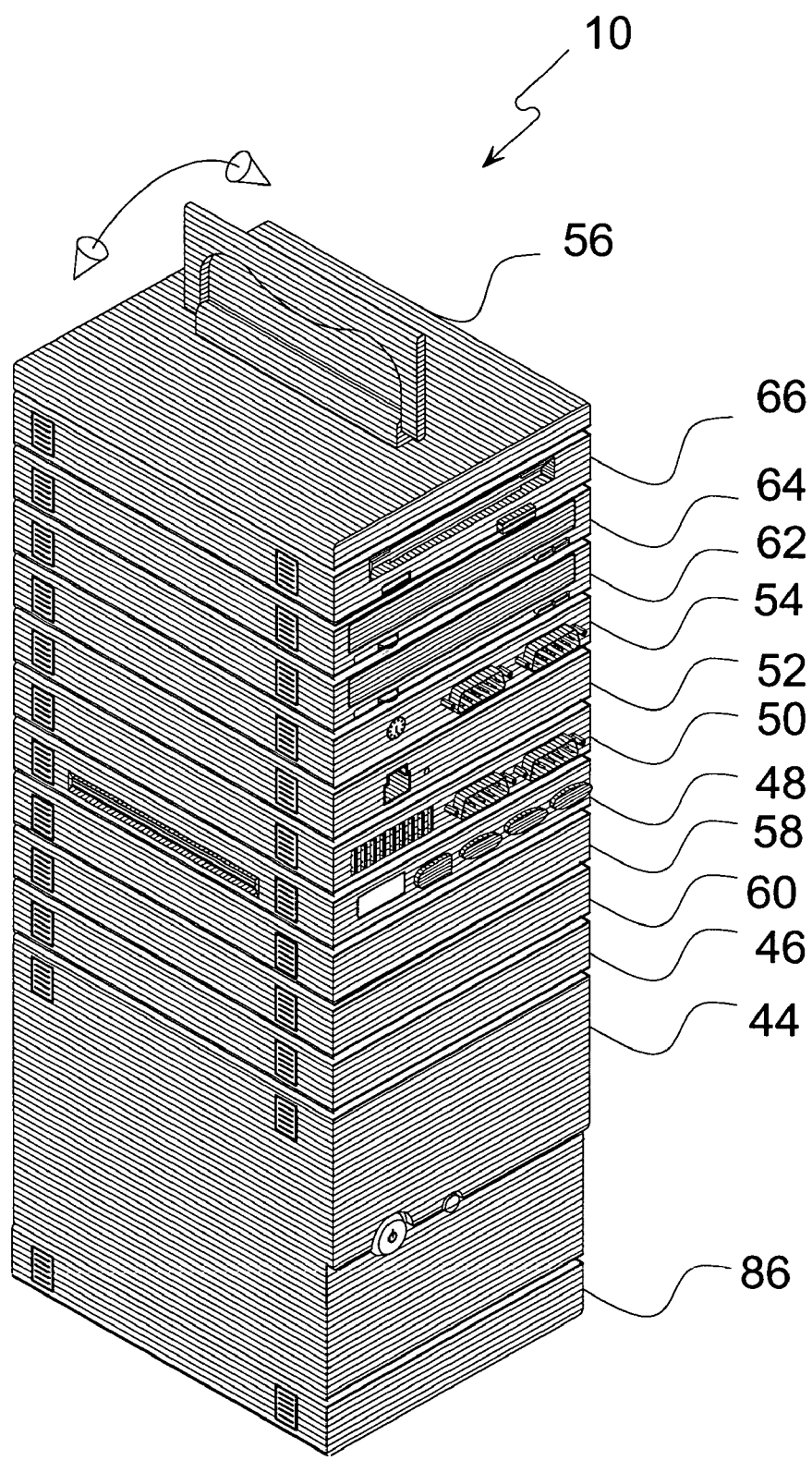
FIG. 6 is an illustrative view of the present invention.

Turning to FIG. 6, shown therein is an illustrative view of the present invention 10. FIG. 6 illustrates a typical configuration of the present invention 10. This particular system provides a base module 86, a power supply module 44, and a motherboard 46 with a variety of drive modules. The other modules include a scanner module 48, a port module 50, a network module 52, a video module 54 and a cap module 56 with handle 58. Also shown are modules for memory 58, processor 60, DVD 62, CD RW drive 68, and floppy disk drive 66.

Figure 7:
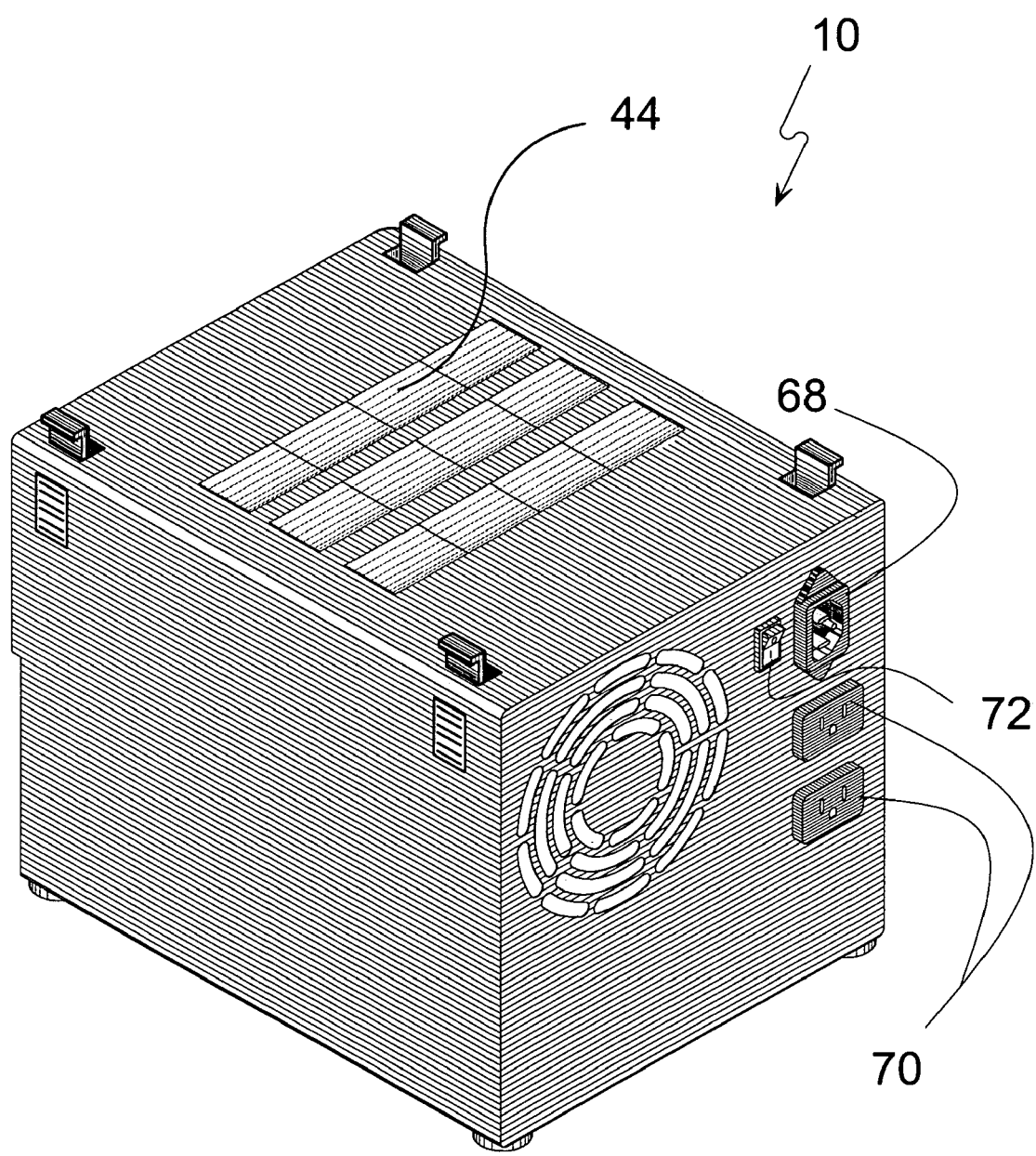
FIG. 7 is an illustrative view of the present invention.

Turning to FIG. 7, shown therein is an illustrative view of the present invention 10. FIG. 7 illustrates the power supply module 44 which is one of the required modules for any configuration of the present invention 10. The power supply module 44 provides ac and dc power for all modules and peripheral equipment. Power and electronic signals are provided to all additional modules from the power supply. Shown are AC power input 68 and output 70 and power switch 72.

Figure 8:
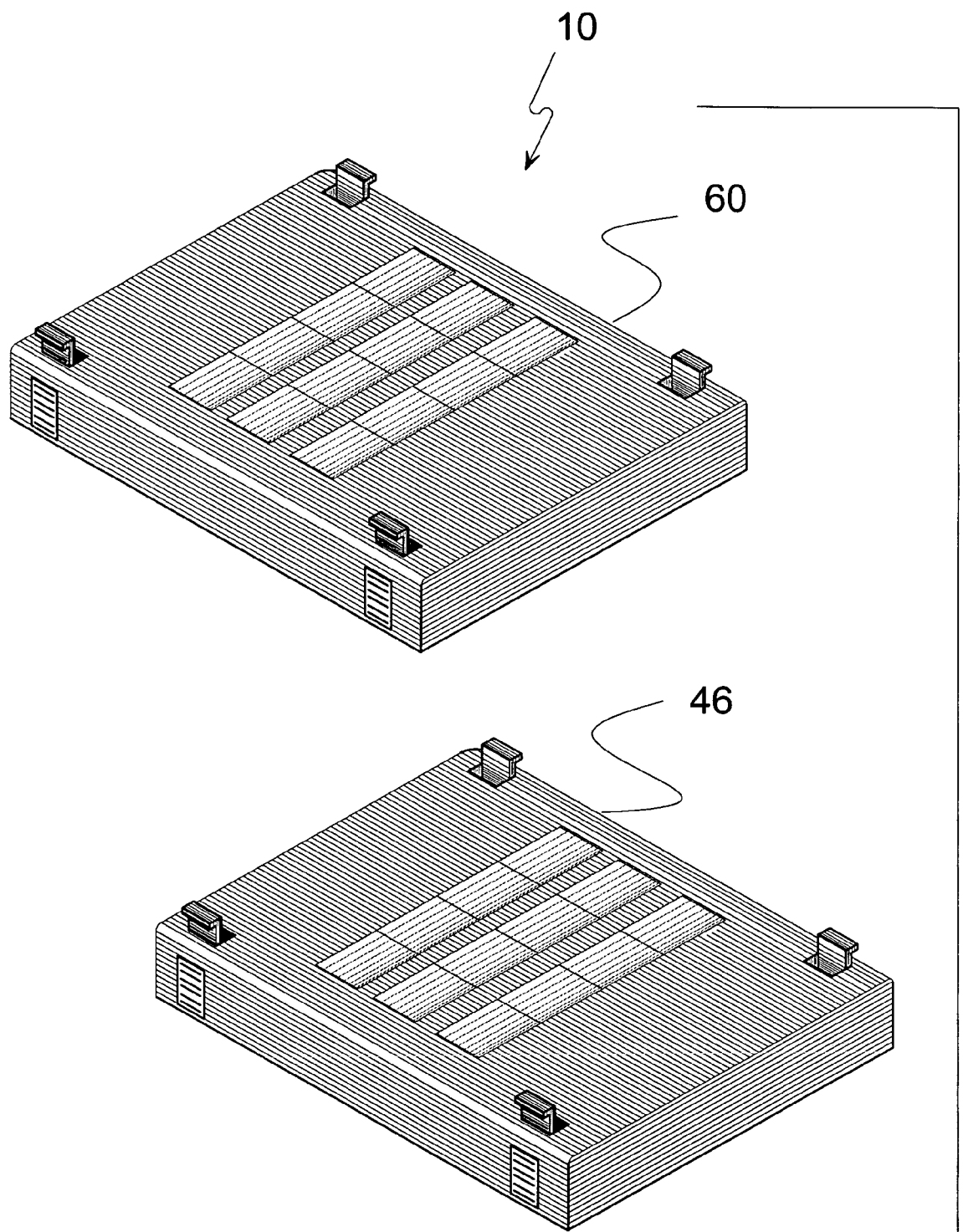
FIG. 8 is an illustrative view of the present invention.

Turning to FIG. 8, shown therein is an illustrative view of the present invention 10. Upgrading a computer's processor often requires that the motherboard also be upgraded. Prior art computer housings are designed to accommodate one particular motherboard with the processor mounted directly on the motherboard. Therefore, in most instances the end user has to acquire a completely new system in order to keep pace with the latest advances in computer technology. The present invention 10 provides a motherboard and processor module 46, 60, which can be changed or upgraded and easily integrated into an existing modular system.

Figure 9:
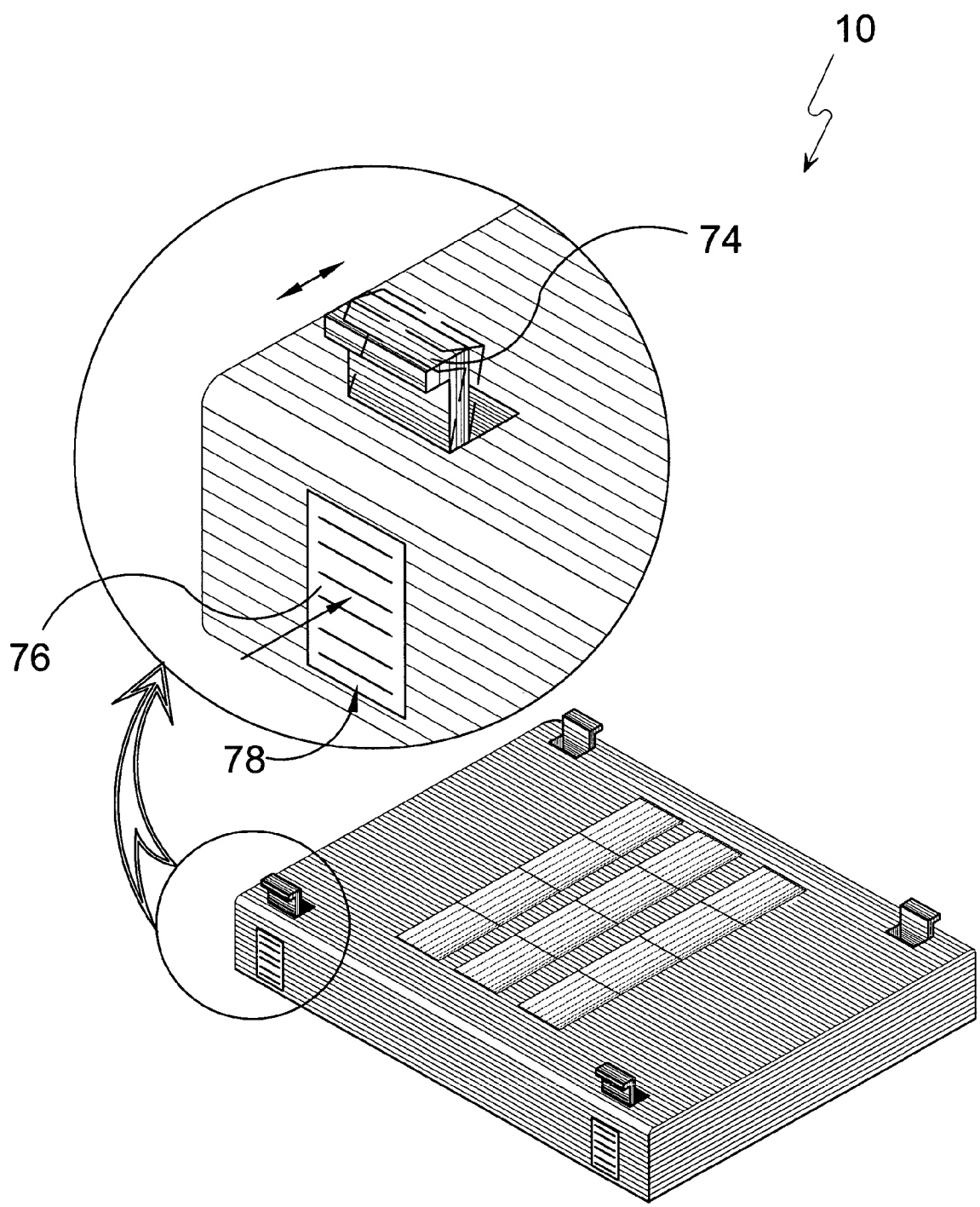
FIG. 9 is an illustrative view of the present invention.

Turning to FIG. 9, shown therein is an illustrative view of the present invention 10. Modules are constrained to each other in a vertical stack by means of a top spring loaded clip 74 with a side push button 76 and bottom aperture 78 wherein both members are integral parts on the module case and are of uniform size and geometry for all modules. The end of clip 74 of a first module mates with the aperture of a second module to connect the two modules. These members will be of the same material as the module case. The material will be flexible so that the male member can bend allowing for easy assembly and disassembly of the modules.

Figure 10:
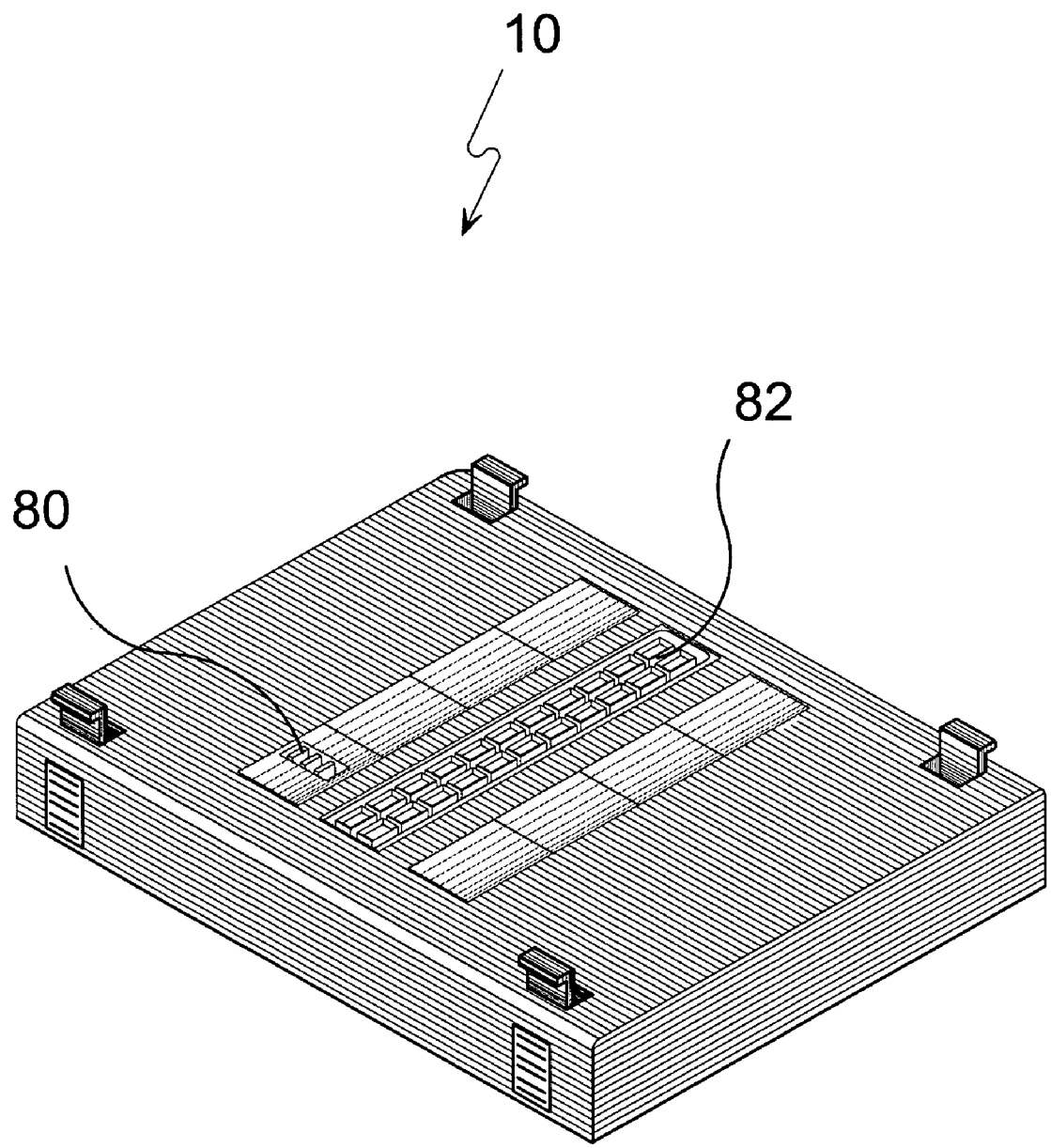
FIG. 10 is an illustrative view of the present invention.

Turning to FIG. 10, shown therein is an illustrative view of the present invention 10. All modules are provided with a variety of interconnecting sockets and ports on the mating surfaces of the module cases. The knock-outs may be removed to accommodate a wide variety of interconnecting members. These interconnecting members provide a buss system for module power 80, electronic circuit signals 82, laser communication and USB ports for all the modules in any particular configuration of the present invention 10.

Figure 11:
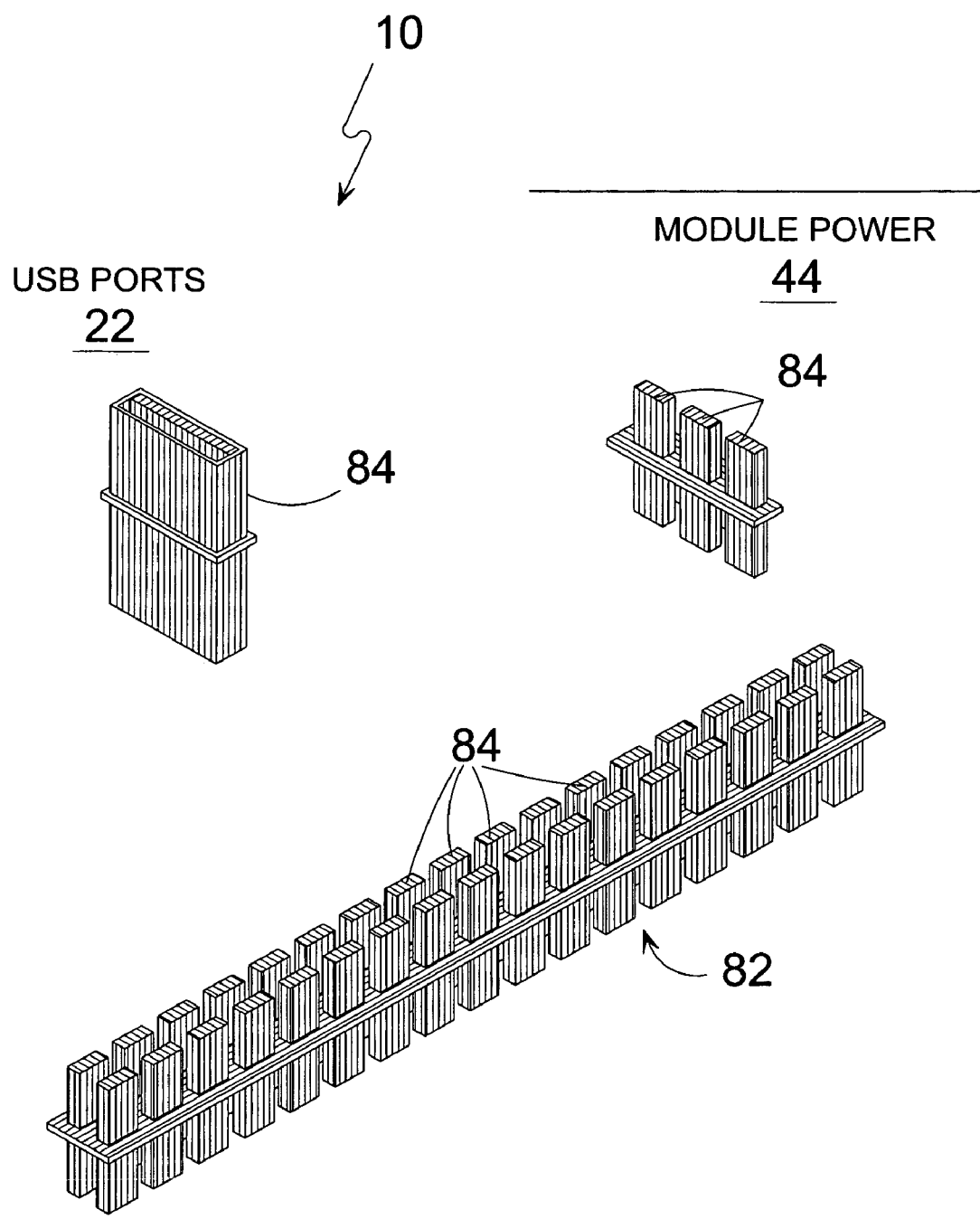
FIG. 11 is an illustrative view of the present invention.

Turning to FIG. 11, shown therein is an illustrative view of the present invention 10. Electronic signals and module power are conducted through jumpers 84 inserted in the sockets, as shown in FIG. 10 in the mating surfaces of the modules. FIG. 11 depicts jumpers 84 for the USB ports 22, power module 44 and electronic circuits sockets connector 82.

Figure 12:
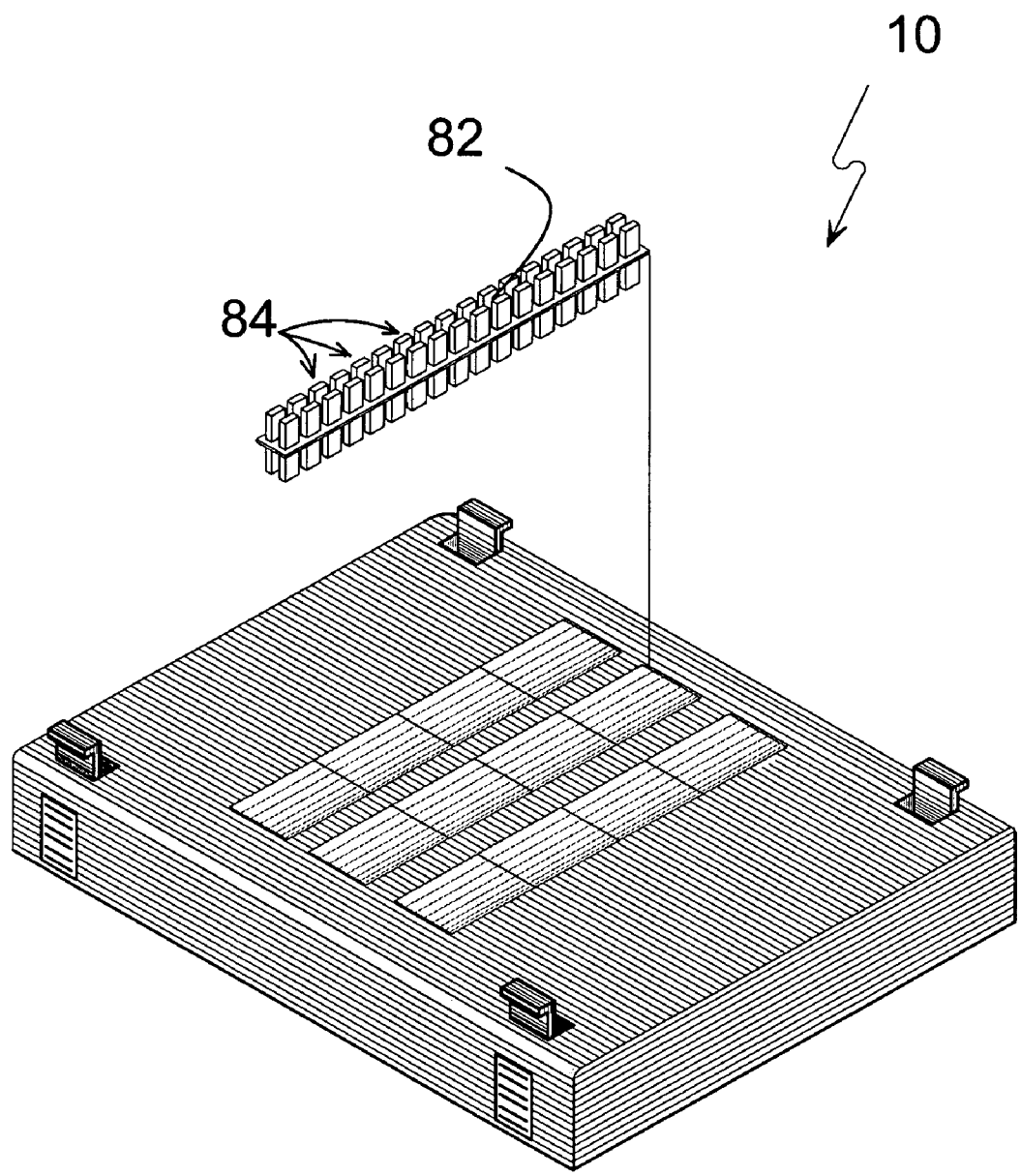
FIG. 12 is an illustrative view of the present invention.

Turning to FIG. 12, shown therein is an illustrative view of the present invention 10. Initial assembly of a complete system, the addition of a module to a system assembly or module upgrade would require the appropriate jumpers 84 be inserted into the various sockets and ports on either mating surface of a module. Different modules may require different socket, port or jumper 84 configurations than shown. Shown is an electronic circuit socket connector 82.

I claim:

1. An apparatus for a computer system, comprising:
   a) a plurality of interconnected modules wherein each module contains components for the computer system therein;
   b) means for physically connecting said modules whereby the modules are physically interconnected;
   c) means for electrically connecting said modules whereby the modules are electrically interconnected; and
   wherein said means for physically connecting said modules comprise:
   wherein each of said modules have a top, a bottom and a side surface, wherein each said bottom surface has a plurality of holes therein;
   a plurality of spring-loaded clips being disposed on said top of a first module;
   wherein said clips can be extended from said top of the first module by using a push button being disposed on said side of the first module; and,
   wherein said clips connects to said holes disposed on said bottom of a second module to permit the first module to be connected to the second module.

2. The apparatus of claim 1, wherein said module contains a power supply.

3. The apparatus of claim 2, wherein said module contains a motherboard.

4. The apparatus of claim 3, wherein said module contains a scanner.

5. The apparatus of claim 4, wherein said module contains ports.

6. The apparatus of claim 5, wherein said module contains networking components.

7. The apparatus of claim 6, wherein said module contains video components.

8. The apparatus of claim 7, wherein said module contains memory.

9. The apparatus of claim 8, wherein said module contains a processor.

10. The apparatus of claim 9, wherein said module contains a DVD.

11. The apparatus of claim 10, wherein said module contains a CD RW.

12. The apparatus of claim 11, wherein said module contains a floppy disk drive.

13. The apparatus of claim 12, wherein said module contains a top cap with handle.

14. The apparatus of claim 13, wherein said power supply comprises an AC power input, an AC power output and an on/off switch to permit the power supply to be controlled.

15. The apparatus of claim 1, wherein said means for physically connecting said modules comprises:
   a) a chassis for containing said modules;
   b) said chassis having top, bottom, front, rear, and first and second side surfaces; and,
   c) wherein said modules are mounting internal said chassis on one of said surfaces of said chassis.

16. The apparatus of claim 1, wherein said means for physically connecting said modules comprises:
   a) a plurality of panels, said panels being interconnected so as to form a housing having top, bottom, front, rear, and first and second side surfaces for housing said modules; and,
   b) at least one knockout panel being removable so that said modules can be placed therein and mounted therein.

17. The apparatus of claim 1, wherein said means for electrically connecting said modules comprises at least one jumper for transmitting data or power between said modules, wherein said jumper is insertable into a socket disposed on said modules.

18. The apparatus of claim 1, wherein said means for electrically connecting said modules comprises at least one port for transmitting data or power between said modules, wherein said port is insertable into a socket disposed on said modules.

19. The apparatus of claim 1, wherein a first module is hand-wired to an existing computer case, wherein said first module serves as an initial module for interconnection of said plurality of modules.

* * * * *